(12) United States Patent
Boic

(10) Patent No.: US 12,223,768 B2
(45) Date of Patent: Feb. 11, 2025

(54) ADAPTIVE LEARNING AND MATCHING OF FACE MODALITIES

(71) Applicant: RealNetworks LLC, Seattle, WA (US)

(72) Inventor: Milko Boic, Seattle, WA (US)

(73) Assignee: REALNETWORKS LLC, Seattle, WA (US)

( * ) Notice: Subject to any disclaimer, the term of this patent is extended or adjusted under 35 U.S.C. 154(b) by 528 days.

(21) Appl. No.: 17/437,764

(22) PCT Filed: Apr. 1, 2020

(86) PCT No.: PCT/US2020/026189
§ 371 (c)(1),
(2) Date: Sep. 9, 2021

(87) PCT Pub. No.: WO2020/205981
PCT Pub. Date: Oct. 8, 2020

(65) Prior Publication Data
US 2022/0157078 A1    May 19, 2022

Related U.S. Application Data

(60) Provisional application No. 62/830,331, filed on Apr. 5, 2019.

(51) Int. Cl.
*G06V 40/16* (2022.01)
*G06V 10/74* (2022.01)
(Continued)

(52) U.S. Cl.
CPC .......... *G06V 40/167* (2022.01); *G06V 10/761* (2022.01); *G06V 10/772* (2022.01);
(Continued)

(58) Field of Classification Search
CPC .... G06V 40/172–40/173; G06V 40/50–40/58; G06V 40/167;
(Continued)

(56) References Cited

U.S. PATENT DOCUMENTS 8,295,610 B1   10/2012   Brunner
8,649,612 B1    2/2014   Brunner
(Continued)

FOREIGN PATENT DOCUMENTS

CN      105512617 A    4/2016
JP      2000149018 A   5/2000
(Continued)

OTHER PUBLICATIONS

International Search Report and Written Opinion, dated Jul. 23, 2020, for Application No. PCT/US2020/026189, 11 pages.
(Continued)

*Primary Examiner* — Mia M Thomas
(74) *Attorney, Agent, or Firm* — Seed IP Law Group LLP

(57) ABSTRACT

Technologies are provided herein for adaptively learning and matching modalities of face images. A face image is obtained and a biometric signature is generated of the face image. The biometric signature is compared with a stored biometric signature obtained from data storage. Differences are determined between the biometric signature and the stored biometric signature and compared with a proximity threshold. As a result of the comparison with the proximity threshold, the identity of the person in the face image may be determined or the face image may be stored in data storage in association with the identity of the person.

17 Claims, 11 Drawing Sheets

(51) Int. Cl.
  *G06V 10/772* (2022.01)
  *G06V 10/98* (2022.01)
  *G06V 40/50* (2022.01)

(52) U.S. Cl.
  CPC .......... *G06V 10/993* (2022.01); *G06V 40/165* (2022.01); *G06V 40/171* (2022.01); *G06V 40/172* (2022.01); *G06V 40/50* (2022.01)

(58) Field of Classification Search
  CPC .. G06V 10/761; G06V 10/772; G06V 10/993; G06V 40/165; G06V 40/171; G06F 18/22
  See application file for complete search history.

(56) References Cited

U.S. PATENT DOCUMENTS

| | | | |
|---|---|---|---|
| 10,963,675 B2 | 3/2021 | Boic | |
| 2004/0095477 A1 | 5/2004 | Maki et al. | |
| 2005/0105780 A1 | 5/2005 | Ioffe | |
| 2005/0147292 A1* | 7/2005 | Huang | G06F 18/254 382/218 |
| 2007/0098230 A1 | 5/2007 | Norita et al. | |
| 2009/0316962 A1 | 12/2009 | Sun et al. | |
| 2010/0172579 A1 | 7/2010 | Reid et al. | |
| 2013/0247175 A1* | 9/2013 | Nechyba | G06V 40/16 726/19 |
| 2013/0266181 A1* | 10/2013 | Brewer | G06V 40/173 382/103 |
| 2013/0266193 A1 | 10/2013 | Tiwari et al. | |
| 2014/0044348 A1 | 2/2014 | Chen et al. | |
| 2014/0301599 A1 | 10/2014 | Shin et al. | |
| 2015/0139492 A1* | 5/2015 | Murakami | G06V 40/168 382/103 |
| 2016/0063314 A1 | 3/2016 | Samet | |
| 2016/0269401 A1 | 9/2016 | Saito et al. | |
| 2017/0124385 A1 | 5/2017 | Ganong et al. | |
| 2018/0114056 A1 | 4/2018 | Wang et al. | |
| 2018/0173941 A1 | 6/2018 | Shin et al. | |
| 2019/0012525 A1* | 1/2019 | Wang | G06V 40/172 |
| 2019/0042835 A1* | 2/2019 | Mostafa | G06F 21/32 |
| 2019/0114760 A1 | 4/2019 | Ni et al. | |
| 2019/0228571 A1 | 7/2019 | Atsmon | |
| 2019/0332851 A1 | 10/2019 | Han et al. | |
| 2020/0097767 A1 | 3/2020 | Perry et al. | |
| 2020/0320282 A1* | 10/2020 | Boic | G06V 40/45 |
| 2021/0312166 A1* | 10/2021 | Yuan | G06V 40/50 |
| 2022/0147750 A1* | 5/2022 | Agarwal | G06V 10/25 |
| 2022/0157080 A1* | 5/2022 | Vardimon | G06F 16/535 |
| 2022/0309837 A1* | 9/2022 | Boic | G06V 40/45 |
| 2022/0343653 A1* | 10/2022 | Lee | G06T 7/246 |
| 2022/0406155 A1* | 12/2022 | Doogan | H04L 9/0866 |
| 2023/0360436 A1* | 11/2023 | Boic | G06F 18/2413 |

FOREIGN PATENT DOCUMENTS

| | | |
|---|---|---|
| KR | 20150059466 A | 6/2015 |
| KR | 10-2018-0109634 A | 10/2018 |

OTHER PUBLICATIONS

PCT/US2020/015686—International Search Report and Written Opinion, mailed May 28, 2020, 10 pages.
Russell, Jon, "Alibaba debuts 'smile to pay' facial recognition payments at KFC in China," Techcrunch, 2017, 11 pages, https://techcrunch.com/2017/09/03/alibaba-debuts-smile-to-pay/, retrieved Nov. 30, 2020.
International Search Report and Written Opinion for PCT Application No. PCT/US2021/026211, dated Jul. 14, 2021, 9 pages.

* cited by examiner

ADAPTIVE LEARNING AND MATCHING OF FACE MODALITIES

This application claims the benefit of priority to U.S. Provisional Application No. 62/830,331, filed Apr. 5, 2019, which application is hereby incorporated by reference in its entirety.

BACKGROUND

Technical Field

The present disclosure relates to systems and methods for processing facial images.

Description of the Related Art

Some processor-based systems are configured to process images for recognizing objects, persons, places, animals, or other such subjects depicted in the images. Such systems face numerous obstacles regarding how images are collected and processed to recognize subjects in the images obtained. At least some of these systems may process information related to previous images in order to recognize or identify the subject depicted in a current image. The previous images may be collected and stored for use in future recognition processing, but it is impractical to collect and process all previous images due to data storage limitations or processing power limitations. Determining what previous images to process or store is a challenging problem. Overinclusion of image information may impede the processing efficiency of the system or occupy a significant amount of data storage space. On the other hand, underinclusion of image information may adversely affect the robustness and accuracy of the system.

In systems in which an appropriate amount of image information is obtained for subject recognition, it may be difficult for the system to appropriately process different views or appearances of the same subject in recognition processing. Even for systems having images with different views stored for a plurality of subjects, the system may more accurately process some views or appearances of subjects than others. For instance, in a facial recognition system that processes images depicting faces, the systems may accurately recognize front views of faces, but may have trouble distinguishing between profile or overhead views of faces. The system may have difficulty distinguishing a side view of a first face from a side view of a second face because side views of faces may appear to be more similar. Therefore, existing computer systems are insufficiently configured to obtain and process images of subjects taken from similar viewpoints relative to the subject or images in which the subjects appear similar.

DETAILED DESCRIPTION

Figure 1:
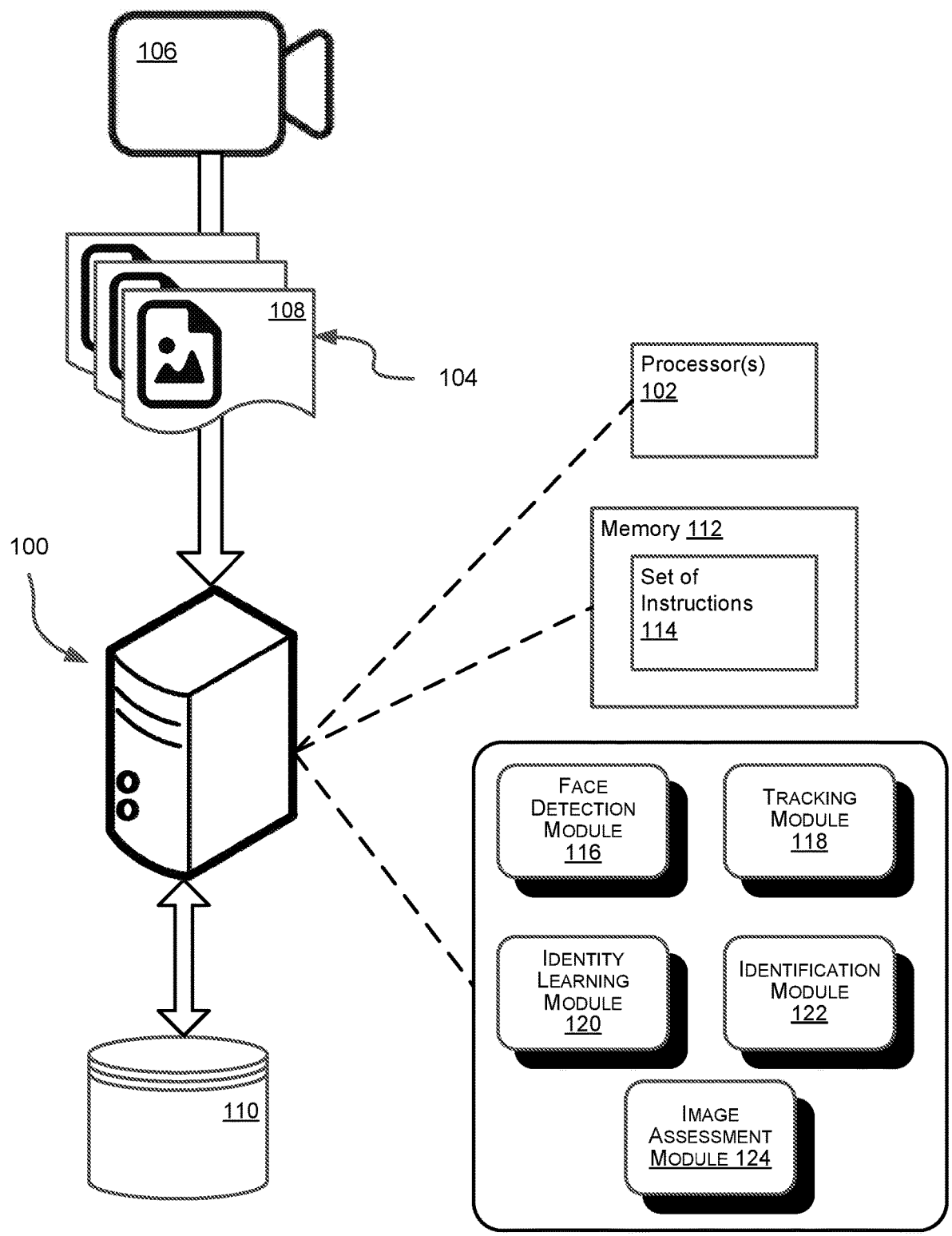
FIG. 1 shows a system for learning and matching modalities of face images.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances. Moreover, the term "subset," as used herein, refers to a collection of one or more members or instances that are collectively smaller in number than the set or plurality of which the subset is comprised. For instance, a subset of a set of ten items will include less than ten items and at least one item.

References to the term "module," as used herein, is to be construed as a collection of hardware configured to perform a set of particular computing functions within a system. The hardware of a module may include one or more processors that are specifically hardwired to perform one or more of the set of particular computing functions. A module may be a set of instructions that, as a result of execution by a processor, causes the processor and associated hardware to perform one or more of a set of particular functions.

References to the term "subimage," as used herein, refers to a portion of an image. A subimage, for example, may be a collection of pixels taken from an image that comprise fewer pixels than the number of pixels of the entire image.

FIG. 1 shows a system 100 for obtaining and processing images according to one or more embodiments. The system 100 includes one or more processors 102 that cause the system 100 to perform one or more operations described herein. The system 100 receives a plurality of images 104 from a camera 106 and determines how to process individual images 108 of the plurality of images 104 received. The system 100 may process an image 108 to determine whether to store the image 108 or a portion thereof in data storage 110 for future subject recognition purposes. The system 100 may also determine how to evaluate the image 108 or a portion thereof to identify or recognize a subject in the image. A subject of the image 108 refers to a person or an object depicted therein. The present disclosure describes the subject as being a face of a person depicted in one or more images 108 of the plurality of images 104. However, those of ordinary skill in the art will understand that the technology discussed herein may extend to other subjects, such as merchandise, packages, animals, and location, by way of non-limiting example.

The system 100 may include memory 112 storing a set of instructions 114 that, as a result of execution by the one or more processors 102, cause the system 100 to perform as described herein. The memory 112 may include volatile memory (e.g., random-access memory) and/or non-volatile memory (e.g., read-only memory) for storing data and instructions. In some embodiments, the one or more processors 102 may include a device having hardware specifically configured to perform at least some of the operations described herein. For instance, the one or more processors 102 may include application specific integrated circuits (ASICs), field programmable gate arrays (FPGAs), system-on-a-chip (SoC), or other specialized or customizable computing hardware hardwired to perform at least some of the operations described herein.

The camera 106 may be part of the system 100 or may be considered to be a component separate from the system 100. The camera 106 is electrically communicatively coupled to the system 100 and provides the plurality of images 104 as an input to the system 100. The camera 106 may be directly coupled to the system 100 via a wired connection or may be remotely coupled to provide the plurality of images 104 to the system 100, for example, over a wired or wireless communication network. In some embodiments, a plurality of cameras 106 coupled to the system 100 may each provide a plurality of images 104 to the system 100. Although the plurality of images 104 are shown as being received from the camera 106, the plurality of images 104 may be received from a source other than the camera 106. For instance, the plurality of images 104 may be received over a network (e.g., local area network, wide area network) and/or via an intermediate device, such as a network router or a server. In some instances, the plurality of images 104 may be stored in memory at a first time and provided to the system 100 at a second time later than the first time.

The system 100 may also include a set of modules for performing various operations described herein. The system 100 may include a face detection module 116 for detecting one or more faces of persons depicted in an image 108 or the plurality of images 104. The system 100 may include a tracking module 118 for tracking a face of a person between sequential images 108 of the plurality of images 104. For example, the tracking module 118 may track a face of a particular person across sequential images 108 in video media. The system 100 may also include an identity learning module 120 that learns identities of persons depicted in an image 108. In some embodiments, the identity learning module 120 causes the system 100 to store, in the data storage 110, information regarding a plurality of modalities represented in different images 108 with an identity, as describe below. The system 100 may also include an identification module 122 that identifies a person represented in an image 108 based on biometric signature information stored in the data storage 110. In some embodiments, the identification module 122 causes the system 100 to identify a person depicted in an image 108 based on a proximity threshold corresponding to a modality of the person's face in the image 108. The system 100 may further include an image assessment module 124 that assesses various characteristics of face images captured to determine whether the characteristics of the face images are appropriate for identity processing, such as learning or updating information associated with an identity stored in the data storage 110 or appropriate to recognize the identity of a person in the face image.

The face detection module 116, the tracking module 118, the identity learning module 120, and the identification module 122 are described as being distinct modules. In some embodiments, two or more of the modules may be combined into a single module that performs the corresponding operations for the respective modules without departing from the scope of the instant disclosure. Some or all of the face detection module 116, the tracking module 118, the identity learning module 120, and the identification module 122 may operate according to machine learning principles by, for example, implementing neural network models or artificial intelligence models to perform their respective operations. As one example, the identity learning module 120 may be generated or trained via supervised or unsupervised learning principles to generate biometric signatures of a face image to evaluate modalities corresponding to the face images in view of a threshold. As another example, the identification module 122 may be generated or trained via supervised or unsupervised learning principles to identify a person in a face image based on a comparison of biometric signatures in view of a threshold determined based on an evaluation of the face image.

Figures 2A, 2B:
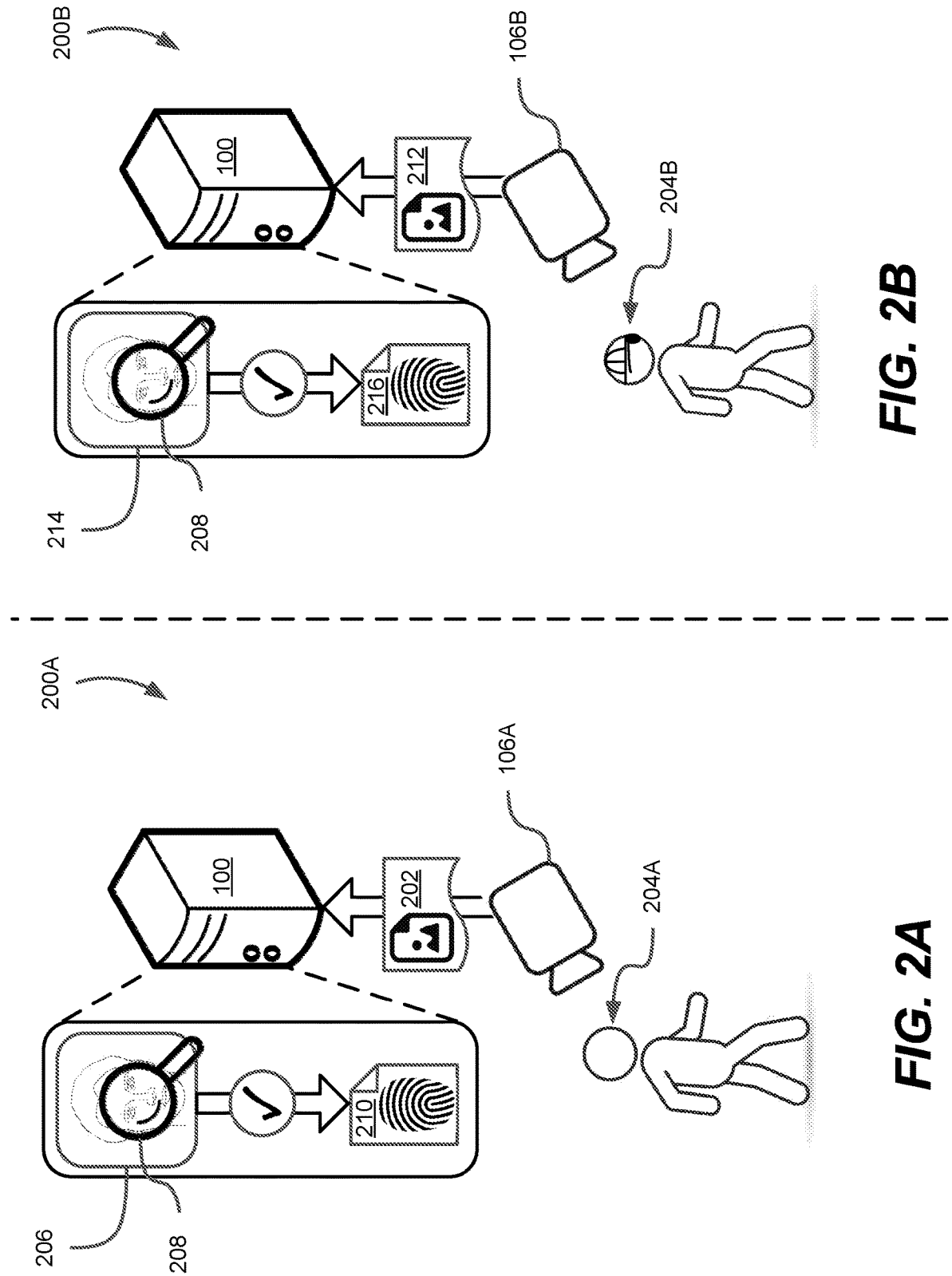
FIG. 2A shows an environment in which a biometric signature is generated of a first face image at a first time.
FIG. 2B shows an environment in which a biometric signature is generated of a second face image at a second time.

FIG. 2A shows an environment 200A in which the system 100 is operating at a first time and FIG. 2B shows the environment 200B in which the system 100 is operating at a second time after the first time. The system 100 may associate multiple modalities of a person with an identity stored in the data storage 110. At the first time in the environment 200A of FIG. 2A, a camera 106A captures a first image 202 that includes a face 204A of a person at the first time. One or both of environments 200A and 200B may be in a public space or may be at an entrance to a restricted area, for example.

The first image 202 is provided to the system 100, which processes the first image 202. In particular, the face detection module 116 may detect a face image 206 in the image 202 based on knowledge-based methods, feature invariant methods (e.g., feature extraction), template matching methods, or appearance-based training methods. The face detection module 116 may be trained or generated by receiving a set of training data and determining correlated relationships between face images and non-face images. The face detection module 116 may identify one or more face images 206 in the first image 202 and extract or generate image data corresponding to the one or more face images 206.

The system 100 may then perform an assessment 208 of the face image 206 to determine whether characteristics of the face image 206 satisfy a set of criteria for processing face images. The system 100 performs the assessment of the face image 206 based on a set of factors and generates image assessment information for the face image 206 based on a result of the assessment. The face image 206 may be evaluated based on image characteristics as well as content of the face in the face image 206. The set of factors may include one or more of a size of the face image 206, a pose of a face in the face image 206, sharpness of the face image 206, and contrast quality of the face image 206. Further description of the assessment 208 and other analysis regarding the face image 206 is described elsewhere herein and in U.S. patent application Ser. No. 16/262,590, filed Jan. 30, 2019, the entirety of which is incorporated herein by reference.

As a result of the face image 206 satisfying the assessment 208, the system 100 may generate a biometric signature 210 of the face image 206. In some embodiments, the biometric signature 210 is a face template having features corresponding to features of a subject's face. The biometric signature 210 may be the output of a neural network or other machine learning model implemented by the system 100. The biometric signature 210 may be a multidimensional array or vector representative of features of the face depicted in the face image 206. The multidimensional array or vector may include a plurality of values representative of the features, and may be representative of distinctions between features, such as distances between features or differences in image characteristics, such as contrast, sharpness, etc.

One example of a multidimensional vector corresponding to a biometric signature may be sets of values that respectively correspond to particular areas of a face depicted in a face image. The particular areas may be regions around each eye, the nose, the mouth, the chin, or portions of the foregoing features, such as corners of the mouth, the bridge of the nose, or the tip area of the nose. Each of the set of values may be representative of characteristics of a corresponding area of the face, such as sizes of the area or features therein or distances between features in each area. Another example of a multidimensional vector corresponding to a biometric signature may be sets of values corresponding to geometric features of a face depicted in a face image. Features, such as pupil centers, nose tip, and mouth corners, may be identified in the face image and distances and directions between the features may be determined. Such distances and directions may be included as sets of values comprising the multidimensional vector. These examples of multidimensional vectors and processes for generating multidimensional vectors are non-limiting and other examples of multidimensional vectors may apply to the current description without departing from the scope of the present disclosure.

In some embodiments, multidimensional vectors may be generated according to a machine learning model that is trained to generate an output using samples as input. The machine learning model may iteratively adjust weights and/or biases to minimize error in the output. The machine learning network may include a neural network having a plurality of layers, including one or more hidden layers, an input layer, and an output layer. The machine learning model may be trained according to supervised learning principles, unsupervised learning principles, or semi-supervised learning principles.

The system 100 may store the biometric signature 210 in data storage 110 for use in future subject identification. The biometric signature 210 may be associated in data storage 110 with an identity of the corresponding person. For instance, the system 100 may store the biometric signature 210 in association with a unique identifier corresponding to the person (e.g., employee identification number, name, known traveler number, social security number). In situations in which a previously-generated identity is not stored in the data storage 110, the system 100 may create a new identity with a unique identifier for the person. In some embodiments, the face image 206 may also be stored in association with the unique identifier.

In the environment 200B at the second time in FIG. 2B, the camera 106 captures a second image 212 that includes a face 204B of the person at the second time. The face of the person 204 has a different modality at the second time than the modality of the face of the person 204 at the first time. Modality, as used herein, refers to a quality, attribute, or appearance of a head or face at a particular point in time. A face having one modality causes the system 100 to generate a first biometric signature that is different than a face having a second modality. As one example, modality may refer to accessories worn on the head of the person, such as a hat, glasses, or jewelry. Another example of modality may be a pose or orientation of a face with respect to an optical axis of the camera 106. Differences in modality not only affect the appearance of the face in an image captured, but also a biometric signature generated using the face image, as described below.

At the second time, the system 100 may obtain the second image 212 of the face 204B of the person having a different modality than the face 204A at the first time, as shown in FIG. 2B. The person at the second time is shown as wearing a hat and glasses in this example, but may have other modalities that are different than the modality of the face 204A at the first time. The system 100 processes the second image 212 according to the same operations described above with respect to FIG. 2A. In particular, a second face image 214 is obtained from the second image 212 and the assessment 208 is performed on the second face image 214. As a result of the second face image 214 satisfying the assessment 208, the system 100 generates a second biometric signature 216 of the second face image 214. The system 100 may recognize that the second biometric signature 216 is different than the biometric signature 210; however, the system 100 may still use the second biometric signature 216 as a basis for identifying the person depicted in the second face image 214.

The operations depicted in and associated with FIGS. 2A and 2B may include other operations described herein. For example, subsequent to or in connection with the assessment 208, the system 100 may attempt to identify the person depicted in the face image 204B by comparing the biometric signature 216 with a set of stored biometric signatures in the data storage 110. As another example, the system 100 may store the second image 214 and/or the second biometric signature 216 in the data storage 110 for future identification processing.

In some embodiments, the image 202 and the second image 212 may be captured in the same location. For instance, the camera 106 may be located at an entrance to a restricted area, such as a secured room or building, to which only authorized persons are permitted to enter. The first time may be an instance (e.g., on a first day) in which the camera 106 captures the image 202 during a first attempt by a person to enter the secured area and the second time may be an instance (e.g., on a second day) in which the camera 106 captures the second image 212 during a second attempt by the person to enter the secured area. In some embodiments, the first image 202 and the second image 212 may be captured at different locations. The system 100 may be communicatively coupled to a plurality of cameras positioned at different locations such that the camera 106A in FIG. 2A is a different camera than the camera 106B in FIG. 2B. The camera 106A may be located in a different building or different room than the camera 106B, for instance. In some embodiments, the second image 212 may be obtained without a sequence of intervening images after the image 202—for example, the image 202 may be obtained at an employee checkpoint on a first day and the second image 212 may be obtained at the employee checkpoint on a second day.

In some embodiments, the second image 212 may be captured as a result of a face tracking operation by the system 100 in which the face of the person is tracked in a sequence of images captured by one or more cameras 106. Tracking may be performed by the tracking module 118. At the first time in FIG. 2A, the camera 106A may capture the image 202 of the face 204A of the person at a first location and provide the image 202 to the system 100. One or more cameras may track the person in real time over a period of time to a second location using, e.g., object tracking or face tracking technologies that track the face or body of the person in a sequence of images, such as a live video stream. Such tracking technologies may involve detecting, e.g., using the face detection module 116, faces of persons captured in the sequence of images; assigning a unique identifier to the face or person; and tracking the person or face as it moves in the sequence of images. While the person is tracked in the sequence of images, the system 100 may analyze the images to identify or learn the identity of the person tracked in the sequence of images. The system 100 may track the person to the second time at which the second image 212 is captured and processed. Such tracking may be performed in a public space, such as an airport or shopping mall.

As an example, the system 100 may obtain the image 202 of a person at time and identify the face 204A of the person depicted in the face image 206 based on information associated with an identity stored in the data storage 110. The system 100 may track, via face tracking or object tracking implemented by the tracking module 118, the person or the face of the person in a sequence of images. The sequence of images may be obtained by a single camera 106A or 106B, or one or more other cameras not shown. The sequence of images may include the image 212 of FIG. 2B. The appearance modality of the person may change between the first time in FIG. 2A and the second time in FIG. 2B. In some embodiments, the system 100 may capture the image 202 and the image 212 without a sequence of images intervening therebetween.

Figure 3:
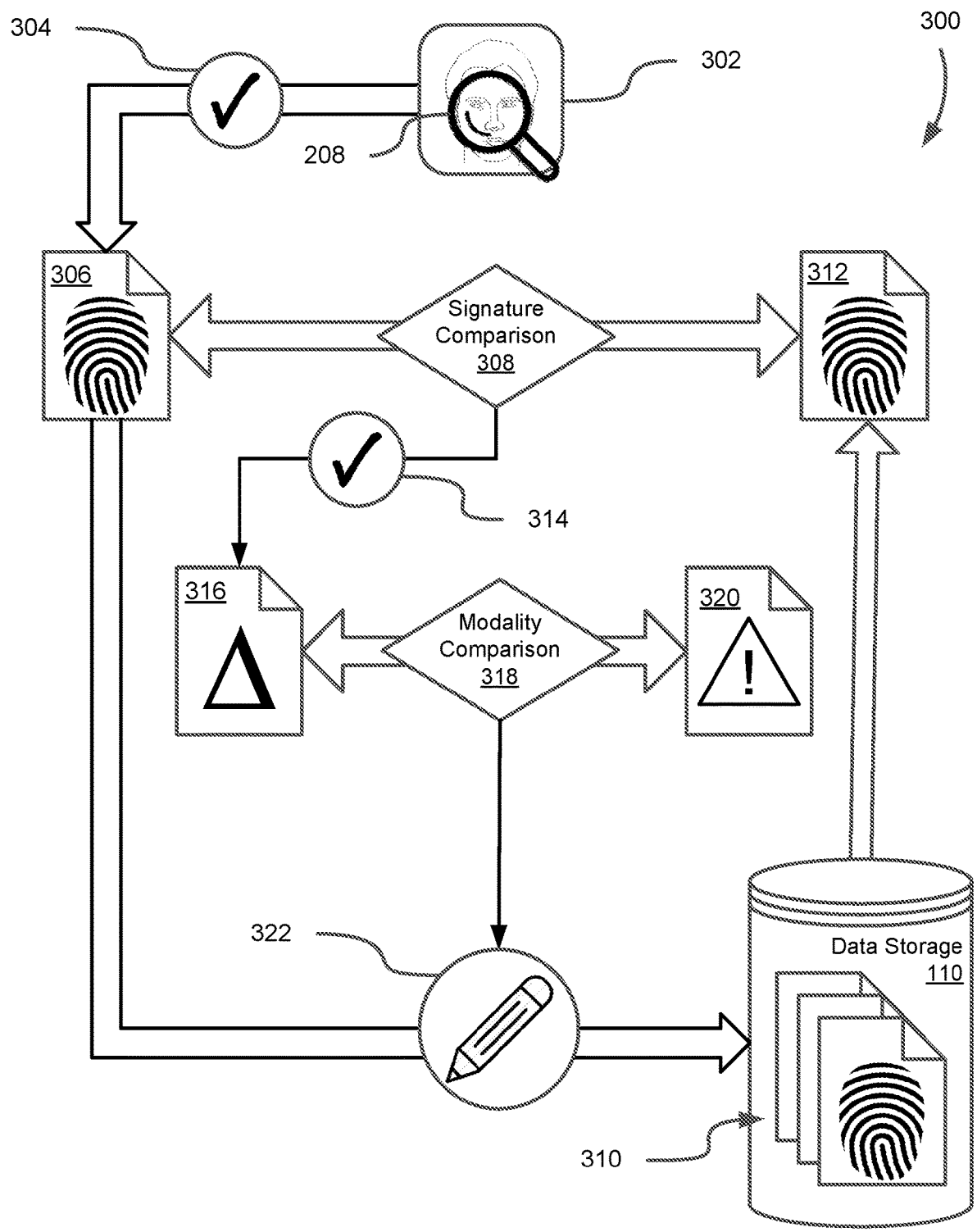
FIG. 3 shows a diagram of a process in which the system of FIG. 1 stores a biometric signature of a face image based on a first comparison.

FIG. 3 shows a diagram of a process 300 in which the system 100 associates a biometric signature of a face image having a distinct image modality in data storage according to one or more embodiments. The process 300 may be performed in connection with an attempt to determine an identity of a person based on a face image captured—for example, in the environment 200B at a time second time as described above with respect to FIG. 2B. The system 100 may obtain a face image 302 captured by the camera 106 and perform the assessment 208 as described elsewhere herein. As a result of verifying 304 that the face image 302 satisfies a set of criteria in connection with the assessment 208, the system 100 may perform operations for identifying the person depicted in the face image 302.

The system 100 may generate a biometric signature 306 of the face image 302 of the subject. The biometric signature 306 can be used to determine the identity of the person depicted in the face image 302. The system 100 may perform operations to determine the subject's identity, which may include performing comparisons 308 of the biometric signature 302 with a set of previously-obtained stored biometric signatures 310 stored in data storage 110. The stored biometric signatures 310 may have associated therewith a corresponding identity of a person associated therewith in the data storage 110. In some embodiments, an identity of a person may be a name or alphanumeric combination (e.g., username, employee identification number) associated with a person. An identity of a person may be information other than a name or alphanumeric combination in some embodiments. For example, an identity of a person may be information associated with a previous instance in which a face image of a particular person was captured, such as information regarding time, date, location, etc. The system 100 may generate a unique alphanumeric value for the identity of the person and store the alphanumeric value in the data storage 110.

For each comparison 308, the system 100 may obtain a stored biometric signature 312 from among the stored biometric signatures 310 in the data storage 110 and determine whether the stored biometric signature 312 matches the biometric signature 306 for the face image 302 being evaluated. A determination that the biometric signature 306 is a match for the stored biometric signature 312 may involve a determination that the biometric signature 306 satisfies a similarity criterion with respect to the stored biometric signature 312. The system 100 may identify 314 the person depicted in the face image 302 as corresponding to the identity associated with the stored biometric signature 312 based on the signature comparison 308. If the biometric signature 306 is not a match for the stored biometric signature 312, the system 100 may perform additional signature comparisons 308 with biometric signatures of the stored biometric signatures 310 until the system 100 determines a match or is unable to match the biometric signature 306 with any of the stored biometric signatures 310.

As a result of identification 314 of the person depicted in the face image 302, the system 100 may perform operations to determine whether the face image 302 corresponds to a modality to be stored in data storage 110 in association with the identity. Storing different modalities for the identity may be useful to identify the person depicted when the person has a different appearance, such as when the person is wearing glasses or a hat, has facial hair, or when a face image depicts the person from a different camera angle with respect to the face. The system 100 may determine a signature differential 316 between the biometric signature 306 and the stored biometric signature 312. The signature differential 316 may correspond to a set of differences between a multidimensional vector of the biometric signature 306 and a multidimensional vector of the stored biometric signature 312. The signature differential 316 may include differences in values between corresponding components of the multidimensional vectors of the biometric signature 306 and the stored biometric signature 312. The differences may correspond to differences in characteristics of corresponding areas of face images, such as differences in sizes of features in each area or distances between features in an area. As one example, the signature differential 316 may include sets of values that correspond to differences between the sets of values of the biometric signature 306 and corresponding sets of values of the stored biometric signature 312.

The system 100 may determine whether the biometric signature 306 is sufficiently different from the stored biometric signature 312 that the biometric signature 306 should be stored as an additional basis for identifying the person associated in the data storage 110 with the stored biometric signature 312. Storing additional modalities for an identity may be useful in identifying the person when visual characteristics of the face of the person diverge from the face image that generated the biometric signature 312. For instance, storing additional modalities may be useful in identifying the person when the person is wearing sunglasses, a hat, jewelry, has a different hairstyle, or facial hair.

To determine whether the biometric signature 306 is sufficiently different, the system 100 may perform a modality comparison 318 in which the system 100 compares the signature differential 316 with a modality threshold 320. If the signature differential 316 exceeds the modality threshold 320, the system 100 determines that the biometric signature 306 corresponds to a valuable modality and performs a storage operation 322 to store the biometric signature 306. Specifically, the biometric signature 306 is stored in the data storage 110 in association with the identity associated with the stored biometric signature 312. The biometric signature 306 is stored in the data storage 110 in addition to the stored biometric signature 312 as an additional indicium for verifying the person's identity.

In some embodiments, the modality threshold 320 may include a set of thresholds that, if exceeded by corresponding values in the signature differential 316, would cause the system 100 to perform the storage operation 322. In some embodiments, the modality comparison 318 may include calculating an aggregate of the values of the signature 316, comparing the aggregate to the modality threshold 320, and performing the storage operation 322 if the aggregate exceeds the modality threshold 320. In some embodiments, the modality comparison 318 may include determining an average or a mean of a set of values of the signature differential 316 and performing the storage operation 322 if the average or the mean exceeds the modality threshold 320. The modality threshold 320 and/or aspects of the modality comparison 318 may be determined by a machine learning model implemented by the system 100. For example, the system 100 may determine a set of thresholds for the signature differential 316 as a result of receiving a set of training data and output results indicating whether corresponding biometric signatures in the training data are sufficient for identity verification.

Figure 4:
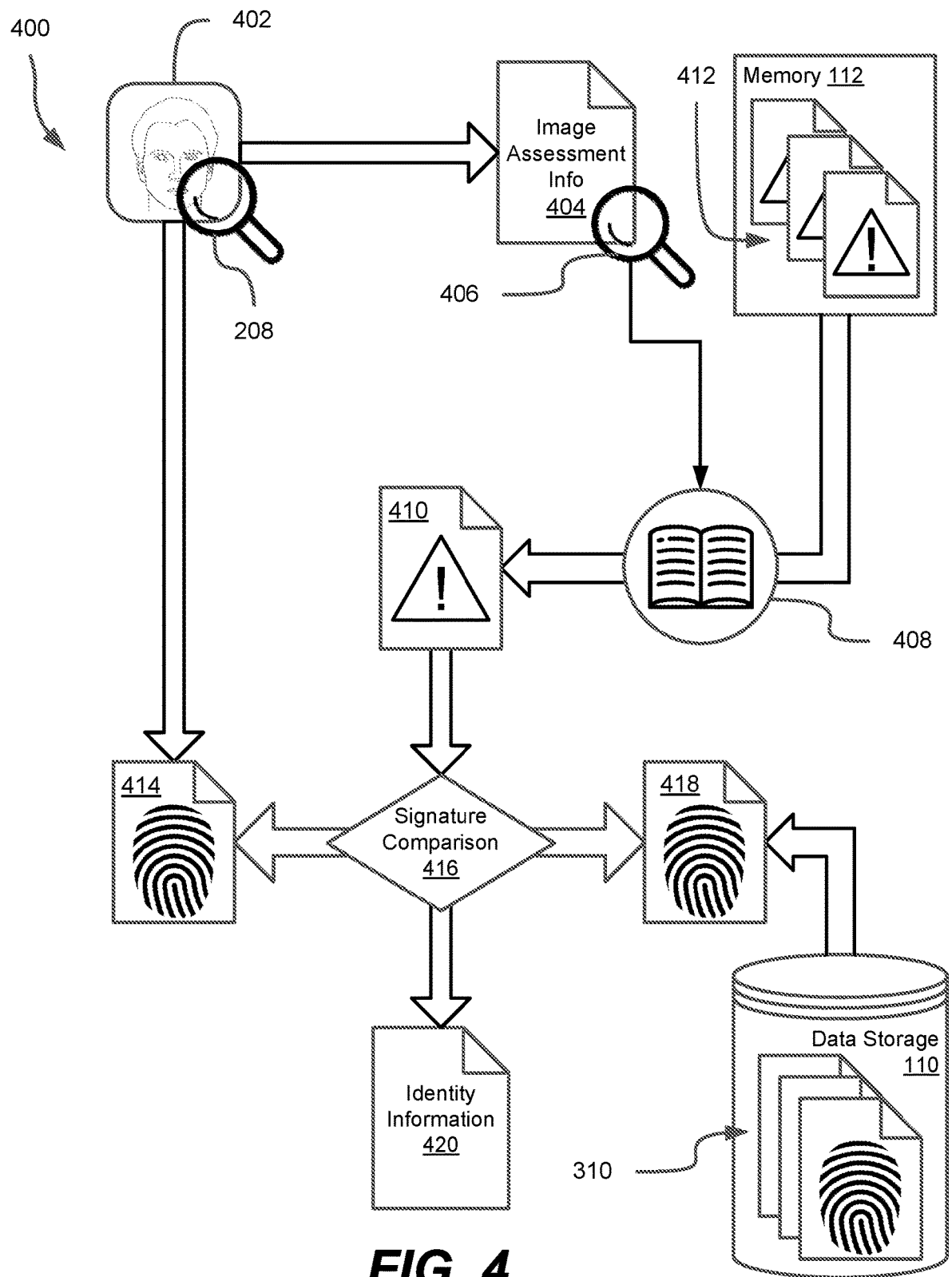
FIG. 4 shows a diagram of a process in which the system of FIG. 1 identifies a person based on a second comparison.

FIG. 4 shows a diagram of a process 400 in which the system 100 identifies a person depicted in a face image according to one or more embodiments. The process 400 may be performed in connection with an attempt to determine an identity of a person based on a face image captured—for example, in the environment 200B at a time second time as described above with respect to FIG. 2B. In some embodiments, the operations discussed with respect to the process 400 may be performed in connection with or as a result of performing the signature comparison 308.

The system 100 may obtain a face image 402 captured by the camera 106 and perform the assessment 208 as described with respect to FIG. 2 above and FIG. 6 below. The system 100 may generate a biometric signature 414 of the face image 402. The system 100 may further generate image assessment information 404 that is representative of characteristics of the face image 402. The image assessment information 404 may include information representative of characteristics of the face image 402 or the face depicted therein, such as an orientation or contrast quality of the face image 402. The system 100 may verify whether the image assessment information 404 satisfies a set of criteria, as described with respect to FIG. 2 above and FIG. 6 below. As a result of verifying 304 that the face image 302 satisfies a set of criteria in connection with the assessment 208, the system 100 may perform operations for identifying the person depicted in the face image 302.

The system 100 may perform an evaluation 406 of the image assessment information 404. The evaluation 406 may include evaluating an appearance modality of one or more characteristics represented in the image assessment information 404. For example, the system 100 may evaluate 406 the image assessment information 404 to determine an orientation of the face depicted in the face image 402 and/or the appearance of accessories or facial hair in the face image 402. Based on a result of the evaluation 406, the system 100 may perform a read operation 408 to select a proximity threshold 410 corresponding to the image assessment information 404. In particular, the system 100 may select the proximity threshold 410 from among a plurality of proximity thresholds 412 based on the image assessment information 404. As a particular example, the system 100 may select or determine the proximity threshold 410 based on a set of values in the image assessment information 404 representative of an orientation of the face in the face image 402. The proximity threshold 410 includes a set of values that represent a maximum or a range of acceptable proximity or differentials between the biometric signature 414 and a stored biometric signature to identify a person depicted in the face image 402.

Figure 5:
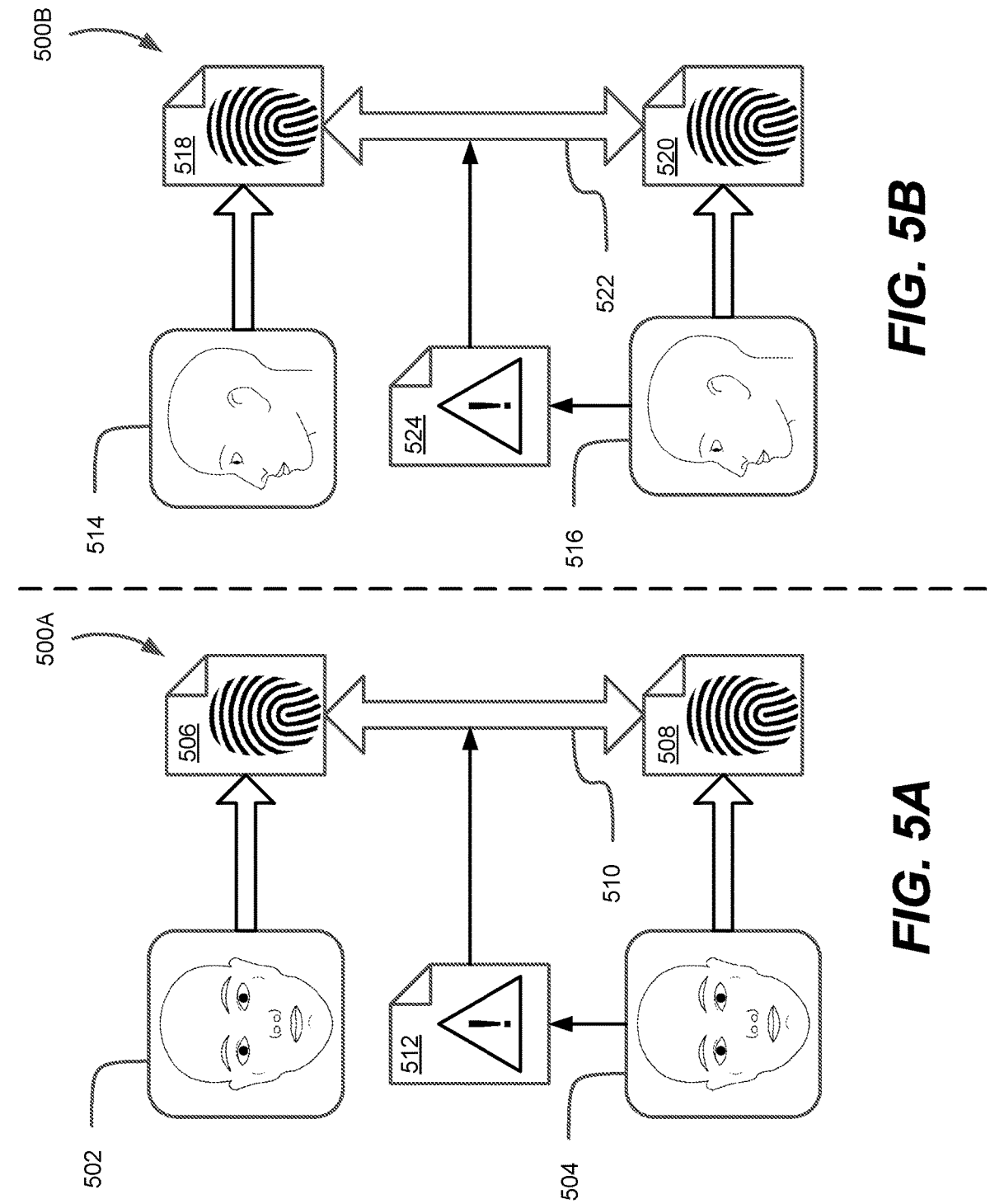
FIG. 5A shows a diagram of a process in which the system of FIG. 1 generates biometric signatures of face images having a first modality.
FIG. 5B shows a diagram of a process in which the system of FIG. 1 generates biometric signatures of face images having a second modality.

The plurality of thresholds 412 may be stored in the memory 112 of the system 100 or stored in the data storage 110 in some embodiments. The proximity threshold 410 may be selected or generated to provide an accurate and precise basis for determining an identity of the person depicted in the face image 402. Profile views of faces of different persons may have a higher degree of similarity than front view of faces of persons. FIGS. 5A and 5B respectively show a diagram of a process 500A and a diagram of a process 500B illustrating differences in face images and corresponding biometric signatures.

In FIG. 5A, a first frontal face image 502 of a person is captured at a first time and a second frontal face image 504 different than the first frontal face image 502 is captured of the person at a second time. The system 100 may generate a biometric signature 506 of the first frontal face image 502 and a biometric signature 508 of the second frontal face image 504. Because the first frontal face image 502 and the second frontal face image 504 include information regarding, e.g., both the left and right sides of the face depicted, the biometric signatures 506 and 508 thereof may contain a significant amount of information. The system 100 may determine an identity of the person shown based on correspondences 510 between the biometric signatures 506 and 508—for instance, based on similarities between respective multidimensional vectors of the biometric signatures 506 and 508. The system 100 may determine that the first front image 502 and the second front image 504 are a match as a result of the biometric signatures 506 and 508 satisfying a first proximity threshold 512.

In FIG. 5B, a first profile face image 514 of a person is captured at a first time and a second profile face image 516 different than the first profile face image 514 is captured of the person at a second time. As in FIG. 5A, the system 100 may generate a biometric signature 518 of the first profile face image 514 and a biometric signature 520 of the second profile face image 516. Because the first profile face image 514 and the second profile face image 516 include information regarding only a single side of the face depicted, the biometric signatures thereof may provide less information regarding the face or faces depicted. The system 100 may determine an identity of the person shown in the face images 514 and 516 based on correspondences 522 between the biometric signatures 518 and 520—for instance, based on similarities between respective multidimensional vectors of the biometric signatures 518 and 520. However, by contrast to the biometric signatures 506 and 508, the system 100 may implement a different proximity threshold than the proximity threshold 512 to ensure a positive match. Because profile views of faces may include less information regarding the faces depicted, the system 100 may seek a higher degree of correspondence between the biometric signatures 518 and 520 than the biometric signature 506 and 508 of the front face views. In particular, the system 100 may determine that the first profile face image 514 and the second profile face image 504 are a match as a result of the biometric signatures 518 and 520 satisfying a second proximity threshold 524.

Providing a higher proximity threshold for profile views of faces helps to ensure that the system 100 will not positively correlate the faces of two different people due to similar appearance when viewed in profile. On the other hand, the system 100 may implement a lower proximity threshold for front views of faces because the front views typically provide more information than the profile views. Other proximity thresholds may relate to accessories, facial hair, makeup, etc. For instance, the system 100 may implement a proximity threshold that is different for a subject wearing sunglasses than a person without sunglasses. The proximity threshold selected for sunglasses may require a closer proximity for certain portions of a biometric signature, such as components of the biometric signature corresponding to the nose, mouth, and chin regions of the face image, than portions of a biometric signature corresponding to the eye regions.

Referring back to FIG. 4, the system 100 may select, generate, or otherwise obtain the proximity threshold 410 from among the plurality of proximity thresholds 412 based on a result of the evaluation 406. For instance, the system 100 may determine, based on the evaluation 406, that the face image 402 is of a profile view of a face and perform the read operation 408 to obtain the proximity threshold 410 corresponding to a profile face view from among the plurality of proximity thresholds 412. Each of the plurality of proximity thresholds 412 may be associated in the memory 112 with a corresponding value, set of values, range of values, etc. The read operation 408 may include obtaining, from the memory 112, the proximity threshold 410 corresponding to the particular value, set of values, range of values, etc., in the image assessment information 404. The memory 110 may include values that are associated with or reference a corresponding proximity threshold to be implemented for the value. The plurality of proximity thresholds 412 may be one or more data objects stored in the memory 110 and which are obtained via accessing a location in the memory 110 referenced or associated with particular values, sets of values, or ranges of values of the image assessment information 404.

The system 100 may use the proximity threshold 410 obtained in a modality comparison 418 to determine whether the biometric signature 414 is a sufficient match to one of the stored biometric signatures 310 in the data storage 110. The system 100 may compare the biometric signature 414 with a stored biometric signature 418 obtained from among the stored biometric signatures 310 and determine whether the stored biometric signature 418 is a match for the biometric signature 414. Determining a match between the biometric signature 414 and the stored biometric signature 418 is a result of a determination that the proximity or similarity of the biometric signature 414 to the stored biometric signature 418 satisfies the proximity threshold 410.

The proximity or similarity of the biometric signature 414 to the stored biometric signature 418 may correspond to differences between a multidimensional vector of the biometric signature 414 and a multidimensional vector of the stored biometric signature 418. In some embodiments, the differences determined in the signature comparison 416 may be differences between components of the multidimensional vectors. In such embodiments, a match may be verified as a result of determining that the differences between respective components of the multidimensional vectors are less than corresponding proximity thresholds for the components specified in the proximity threshold 410. In some embodiments, the signature comparison 416 involves calculating an aggregate of differences between the multidimensional vector of the biometric signature 414 and the multidimensional vector of the stored biometric signature 418. In such embodiments, a match between the biometric signature 414 and the stored biometric signature 418 is based on the aggregate of the differences being less than or equal to a proximity threshold value specified in the proximity threshold 410. In some embodiments, the signature comparison 416 may involve calculating an average or a mean of the differences between the biometric signature 414 and the stored biometric signature 418. The match between the biometric signature 414 and the stored biometric signature 418 may be determined based on the system 100 determining that the average or the mean is less than or equal to corresponding threshold values in the proximity threshold 410.

If the biometric signature 414 is not a match for the stored biometric signature 418 based on the proximity threshold 410 selected, the system 100 may perform additional signature comparisons 416 with biometric signatures of the stored biometric signatures 310 until the system 100 determines a match or is unable to match the biometric signature 414 with any of the stored biometric signatures 310.

Using the selected proximity threshold 410 as a basis for determining a match for the biometric signature 414 enables the system 100 to adaptively evaluate and match face modalities to identify persons depicted in face images. The system 100 is described as performing operations in and associated with the process 400 to adaptively apply different proximity thresholds of the plurality of proximity thresholds 412 based on an orientation or pose of a face in the face image 402—for example, whether the face image 402 is a profile view or a front view.

The plurality of proximity thresholds 412 may include proximity thresholds for other modalities. For example, the plurality of proximity thresholds 412 may include proximity thresholds for different angles of a face with respect to an optical axis of a camera. As another example, the plurality of proximity thresholds 412 may include one or more proximity thresholds for accessories, such as proximity thresholds for vision correction glasses, sunglasses, hats, jewelry, scarves, and other accessories worn on or around the face. As a further example, the plurality of proximity thresholds 412 may include proximity thresholds for beards, mustaches, goatees, and other facial hair.

In some embodiments, the plurality of proximity thresholds 412 may include proximity thresholds related to characteristics of the face image 402 as indicated in the image assessment information 404. For instance, the plurality of proximity thresholds 412 may include proximity thresholds related to sharpness characteristics of the face image 402, the size of the face image 402, and/or the contrast quality of the face image 402. Further discussion of such image characteristics is discussed herein with respect to FIG. 6 below and in U.S. patent application Ser. No. 16/262,590, filed Jan. 30, 2019, the entirety of which is incorporated herein by reference.

In some embodiments, some of the plurality of proximity thresholds 412 may include heightened biometric signature proximity threshold requirements or restrictions. In some applications, such as where access to potentially dangerous or hazardous materials is at issue, the system 100 may require a high degree of similarity or an exact match between the biometric signature 414 and the stored biometric signature 418. In such situations, the proximity threshold 410 obtained for the application may only identify a person for select modalities, such as a front face or a face devoid of accessories. That is, the system 100 may implement a proximity threshold sufficiently high that only front views of face images can be used to successfully identify a person, or the proximity threshold 410 may indicate that the modality corresponding to the face image 402 is excluded from consideration for identification purposes.

The system 100 may implement a machine learning model to generate some or all of the plurality of proximity thresholds 412 stored in the memory 110. The system 100 may generate some or all of the plurality of proximity thresholds 412 as a result of receiving training data including modalities of face images to determine what output (i.e., proximity thresholds) correspond to what inputs (e.g., face modalities, proper identifications). This allows the system 100 to effectively integrate and organize correspondences into one or more layers of correlations between the inputs and outputs. Examples of such machine learning models include neural networks (e.g., convolutional neural networks, deep neural networks).

As a result of determining a match between the biometric signature 414 and the stored biometric signature 418 that satisfies the proximity threshold 410, the system 100 determines identification information 420 associated with the person depicted in the face image 402. For instance, the system 100 may determine that the person depicted in the face image 402 corresponds to the identity associated with the stored biometric signature 418 in the data storage 110. As described elsewhere herein, the identity may be a name, unique alphanumeric identifier (e.g., employee number, social security number), or an indication of a time, date, location, etc., at which the person was previously identified. As a result of identifying the person depicted in the face image 402, the system 100 may output identification information 420 corresponding to the identity determined. The identification information 420 may indicate the identity of the person or may indicate other information associated with the identity, such as whether the person is authorized to enter a particular restricted area.

Figure 6:
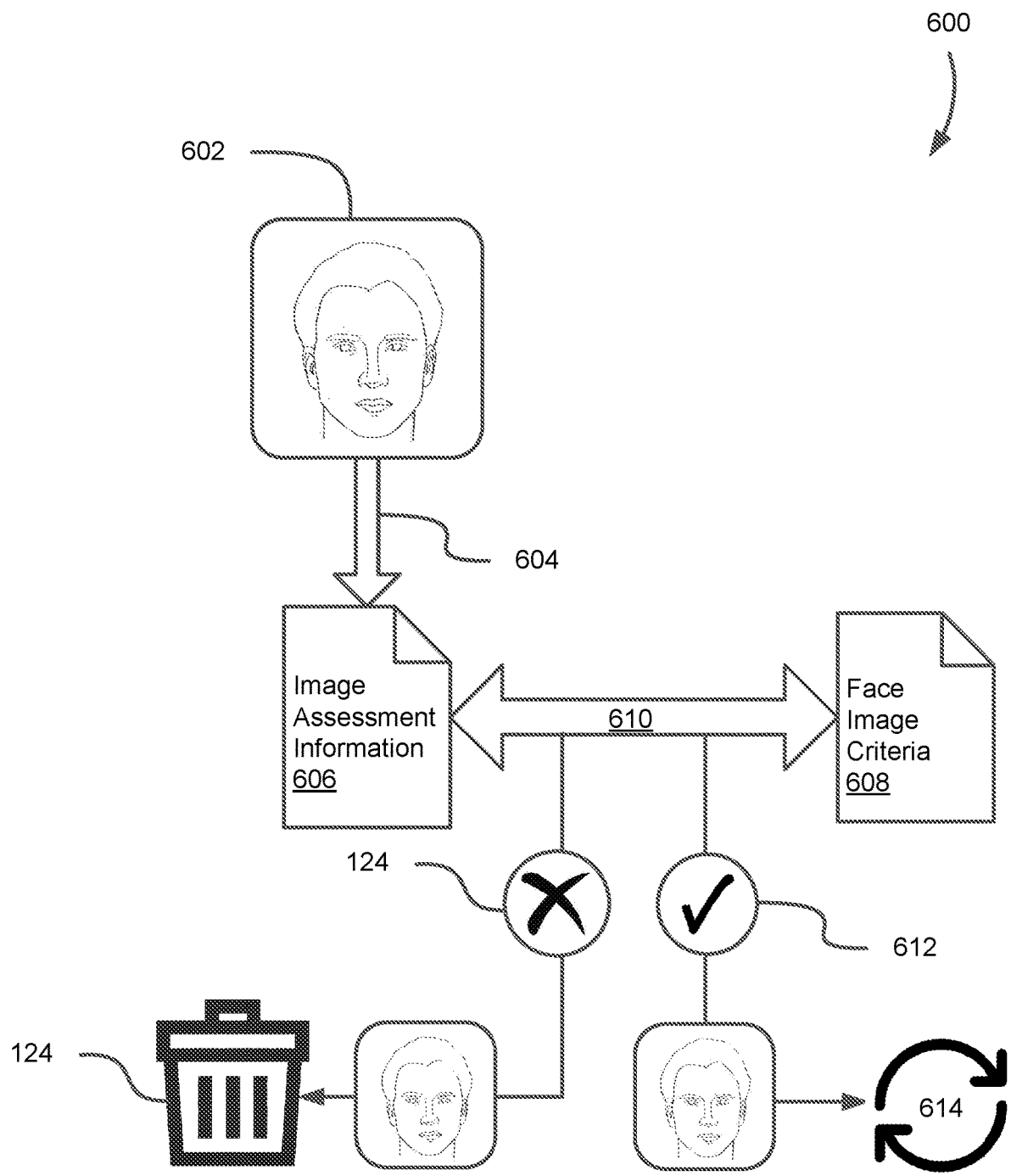
FIG. 6 shows a diagram of a process in which characteristics of an image are assessed according to one or more embodiments.

FIG. 6 shows a diagram of a process 600 in which the system 100 performs the assessment 208 described above with respect to FIGS. 2, 3, 4, and elsewhere herein. The process 600 and assessment 208 may be performed by one or more appropriate components of the system 100, such as the image assessment module 124 described herein. The system 100, according to the process 600, performs operations for determining whether a face image should undergo further facial recognition processing. The face image 602 may be obtained, for example, at the first time discussed with respect to the environment 200A of FIG. 2A, at the second time discussed with respect to the environment 200B of FIG. 2B, or at a time therebetween. The face image 602 may be a portion of a larger image captured by the camera 106 and received by the system 100. The system 100 may detect the face image 602 in the larger image and extract the face image 602 therefrom for the assessment 208 and/or potential facial recognition processing, such as identifying the person depicted in the face image 602 or storing information regarding the face image 602 in data storage 110.

Because processes related to identification processing of a person (e.g., facial recognition) are resource intensive, determining face images that satisfy a certain set of criteria helps to ensure that those face images having certain qualities correlated to a higher likelihood of identifying persons are processed for facial recognition. As a result, face images having less desirable qualities for face recognition are discarded, or at least not used for facial recognition, and the efficiency of resources directed to facial recognition processes may be improved.

The face image 602 may be obtained as a result of the system 100 detecting the presence of a face in an image (e.g., via the face detection module 116) or as a result of the system 100 tracking a person or face in a sequence or collection of images (e.g., via the image assessment module 124). To determine whether the face image 602 has qualities sufficient for performing identification processing, the system 100 performs an assessment of the face image 602 based on a set of factors. The assessment 604 may evaluate image characteristics as well as content regarding the face in the face image 602. The set of factors may include one or more of a size of the face image 602, a pose or orientation of a face in the face image 602, sharpness of the face image 602, and contrast quality of the face image 602. The image assessment information 606 generated includes information regarding some or all of the foregoing set of factors. In particular, the image assessment information may include information regarding the size of the face image 602, the pose or orientation of the face in the face image 602, the sharpness of the face image 602, and the contrast quality of the face image 602.

The image assessment information 606 generated in the assessment 604 is evaluated based on a set of face image criteria 608 to determine whether to advance the face image for further processing. The face image criteria 608 includes a set of criteria corresponding to the aforementioned set of factors—namely, criteria regarding one or more of the size of the face image 602, the pose of the face in the face image 602, the sharpness of the face image 602, and the contrast quality of the face image 602. The set of criteria may specify a different threshold or condition corresponding to each of the set of factors. The system 100 compares 610 the information for each factor in the image assessment information 606 to the corresponding threshold or condition in the face image criteria 608. As a result of determining that the image assessment information 606 satisfies each of the set of criteria of the face image criteria 608, the system 100 approves 612 the face image 602 for facial processing 614. Advancing the face image 602 for facial recognition processing 614 may include evaluating the face image 602 for storing into the data storage 110; identifying a person depicted in the face image 602, or further evaluating the character (e.g., stability, consistency) of the face image 602 for facial recognition purposes. On the other hand, as a result of determining that the image assessment information 606 fails to satisfy each of the set of criteria of the face image criteria 608, the system 100 will not advance the face image 602 for facial recognition processing 614 and may instead eliminate 616 the face image 606 from consideration.

The system 100 may process each face image 602 received determine whether to perform facial recognition processing thereon. The system 100 may process a plurality of captured sequentially over time and determine which of the images contain face images are suitable for facial recognition processing 614 based on the operations described with respect to the process 600. The plurality of images, for instance, may be a stream of video data, a video data object, or a collection of image data objects sequentially captured by the camera 106. The system 100 may continue to obtain images (e.g., from the camera 106, from another system) until a suitable face image 602 is identified for facial recognition processing or until no more images remain for processing. The system 100 may replace stored face image 114 with a face image 114 determined as having superior or better characteristics (e.g., sharpness, pose) than the stored face image 114.

As a result of the operations described with respect to the process 600, the system 100 is configured to identify face images having preferable characteristics for facial recognition processing and thereby generate biometric signatures better suited for facial recognition purposes. This helps to improve the accuracy and efficiency of the system 100 over time by performing facial recognition processing on select face images and excluding face images having less desirable characteristics for facial recognition processing. Further description and details of the face image evaluation is described in U.S. patent application Ser. No. 16/262,590, the entirety of which is incorporated herein by reference.

Figure 7:
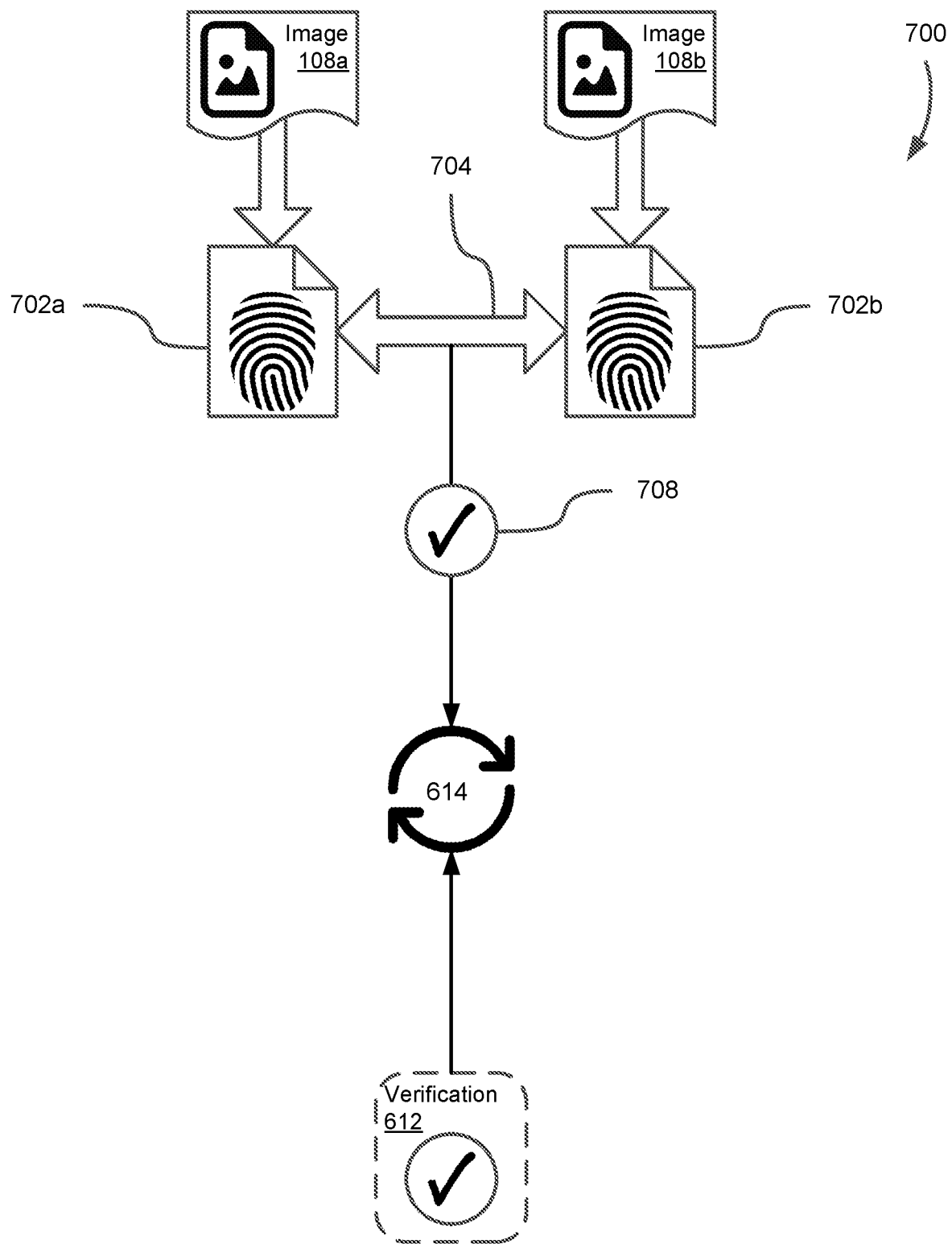
FIG. 7 shows a diagram of a process in which the consistency of one or more images is verified according to one or more embodiments.

FIG. 7 shows a diagram of a process 700 of verifying consistency of an image obtained according to one or more embodiments. The system 100 evaluates the images obtained to help ensure that an inconsistent or unrepresentative image is not used for facial recognition purposes. For instance, if there is a significant amount of motion during the image capture or there is cigarette smoke passing through the image, these occurrences may result in a biometric signature that is inadequately representative of the subject. Therefore, using the biometric signature in such a situation could lead to inaccurate facial recognition results and waste resources. The system 100 verifies consistency of images obtained before proceeding to perform facial recognition processing 614, as discussed herein. The consistency verification may be performed by the image assessment module 124.

The consistency verification shown in the process 700 involves obtaining the plurality of images 104 sequentially captured by the camera 106 over time, as described herein with respect to FIG. 1. The camera 106 may capture at least a first image 108a and a second image 108b sequential to the first image 108a for consistency verification. The plurality of images 104 obtained are not necessarily immediately sequential—for example, a time period (e.g., 10 milliseconds, 1 second, 2 seconds) may separate first time at which the first image 108a is captured and a second time at which the second image 108b is captured. In some instances, there may be one or more images captured between the first image 108a and the second image 108b.

One of the images 108a and 108b may correspond to the image 212 described with respect to FIG. 2 and one of the images 108a and 108b may contain the face image 214 that the system 100 is considering for facial recognition processing. Although only two images 108a and 108b are depicted and described, the system 100 may evaluate more than two images in connection with image consistency verification. In some embodiments, the system 100 may generate or obtain biometric signatures 702a and 702b of all or portions of corresponding images 108a and 108b. For instance, the signature 702a may be of a portion of the image 108a detected as being a face image and the signature 702b may be of a portion of the image 108b determined as corresponding to the face image in the image 108a. In some embodiments, the signatures 702a and 702b may be signatures of the entire corresponding images 108a and 108b. Generation of the signatures 702a and 702b may be performed according to the process discussed for generating biometric signatures herein.

The system 100 may then perform a comparison 404 between the first signature 702a and the second signature 702b to determine consistency between the signatures. The signatures 702a and 702b may be represented as respective arrays of values corresponding to multidimensional vectors in Euclidean space. The system 100 may determine differentials between corresponding values in arrays to the signatures 702a and 702b to determine how consistent the images 108a and 108b are with each other. The system 100 may compare 704 the differentials with one or more thresholds or ranges and determine that the images 108a and 108b are within an acceptable range of consistency. If the signatures 702a and 702b are determined to be sufficiently similar or close in vector space, an consistency verification output 708 is generated indicating that the images 108a and 108b are verified as consistent. If the signatures 702a and 702b are insufficiently similar, the system 100 may not generate the consistency verification output 708 or generate an output disapproving facial recognition processing 614 for the face image 214. In some embodiments, the system 100 may consider more than two sequential images 108a and 108b or portions thereof in the consistency verification shown in the process 700. For example, the system 100 may verify that three signatures corresponding to three sequential images of the plurality of images 104 are sufficiently similar as a condition precedent to issuing the consistency verification output 708.

As a result of generating the consistency verification output 708 and the verification output 612, the system 100 may initiate facial recognition processing 614. The facial recognition processing 614 may include operations described with respect to one or both of the process 300 of FIG. 3 and the process 400 of FIG. 4. In some embodiments, a single one of the consistency verification output 708 and the verification output 612 may be sufficient to initiate facial recognition processing 614.

Figure 8:
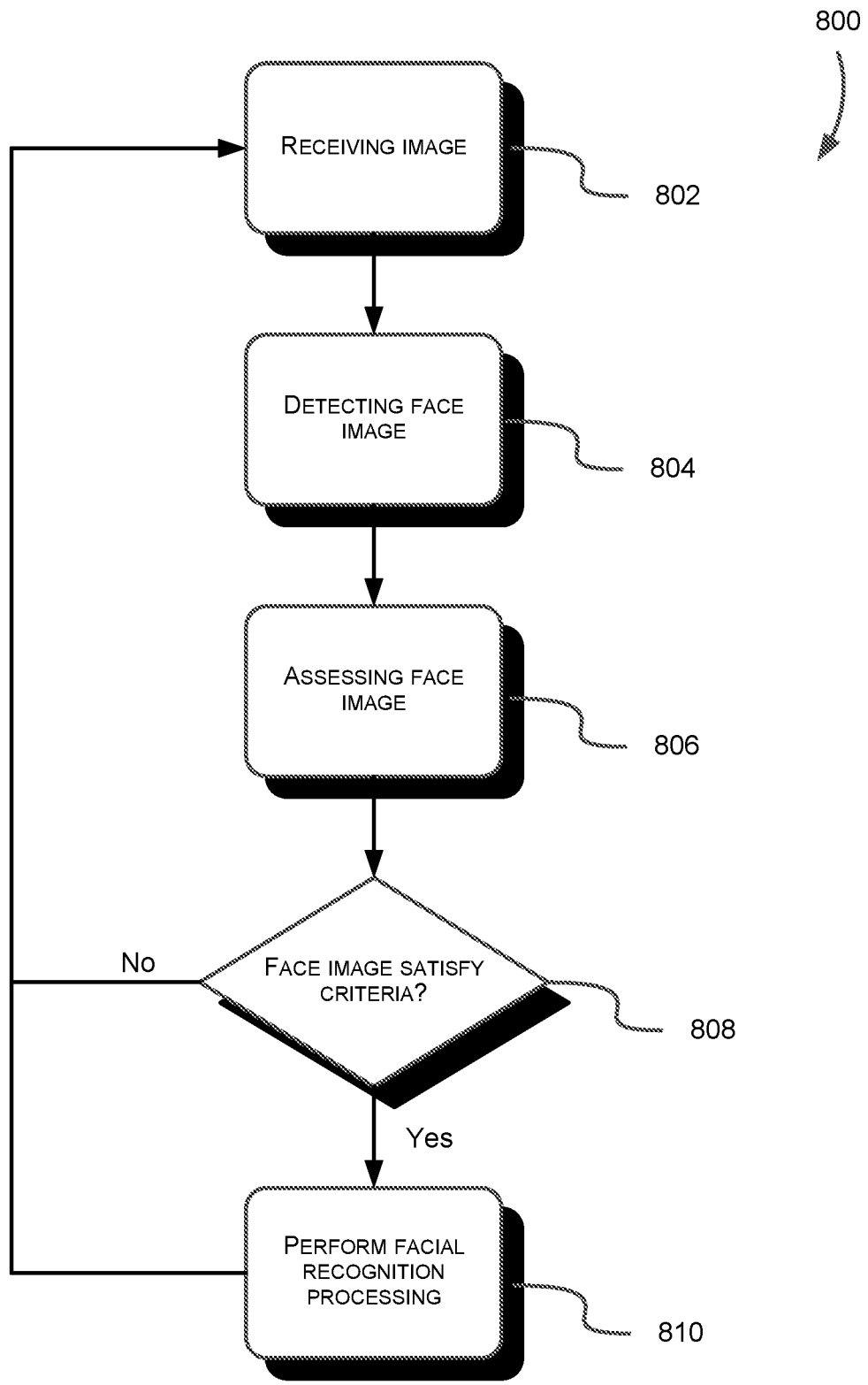
FIG. 8 shows a method in which a face image is assessed for facial recognition processing.

FIG. 8 shows a method 800 for evaluating an image for facial recognition processing by the system 100 according to one or more embodiments. The method 800 may be performed in connection with operations, systems, diagrams, and components described with respect to FIGS. 1 through 7 herein and in U.S. patent application Ser. No. 16/262,590. The method 800 begins by receiving 802 an image, such as the image 202, the image 212, or the plurality of images 104 described herein. The image may be received in 802 from a camera 106 communicatively coupled to the system 100 or that is part of the system 100.

In 804, the method 800 includes detecting 804, at a first time, a face image in the image received in 802. Detecting 804 the face image may include detecting the face image 206 or the face image 214 described with respect to FIG. 2. For instance, the face detection module 116 of the system 100 may detect one or more faces in the image received. In some embodiments, where an image was previously received before receiving 802 the image, detecting 804 the face image may include tracking the person or the face in the image received at 802.

The method 800 further includes assessing 806 the face image detected in 804 to determine whether the face image satisfies a set of criteria for performing facial recognition processing. Assessing 806 the face image may include performing, by the system 100, the assessment 208 described with respect to FIG. 2, the operations described with respect to the process 600 of FIG. 6, the operations described with respect to the process 700 of FIG. 7, and the methods and operations described in U.S. patent application Ser. No. 16/262,590. For example, in connection with assessing 806 the face image detected, the system 100 may generate the image assessment information 404 or the image assessment information 606 respectively described with respect to FIGS. 4 and 6.

In 808, the method 800 includes determining whether the face image satisfies a set of criteria for performing facial recognition processing according to one or more embodiments. The system 100 may compare the image assessment information 606 with the face image criteria 608, as described with respect to FIG. 6, to determine whether the face image is suitable for facial recognition processing. Assessing 806 the face image may also include verifying the consistency of the image as described with respect to the process 700 of FIG. 7. If the system 100 determines that the image assessment information 606 satisfies the criteria and/or that the image received is verified as being sufficiently consistent, the method 800 may proceed to performing 810 the facial recognition processing. If not, the method 800 returns to 802 to receive another image.

Performing 810 facial recognition processing may include performing the operations described with respect to the process 300 of FIG. 3 or the process 400 of FIG. 4. For example, the system 100 may determine to store the face image in data storage 110 in association with an identity based on the modality comparison 318, as described with respect to FIG. 3. As another example, the system 100 may determine an identity of the person depicted in the face image based on the biometric signature comparison 416 involving the proximity threshold 410 selected, as described with respect to FIG. 4. After initiation or completion of the facial recognition processing in 810, the system 100 may return to wait to receive 802 another image at a second time after the first time. For instance, after processing the image 202 including the face image received or detected at the first time, the system 100 may receive 802 or otherwise obtain the second image 212.

Figure 9:
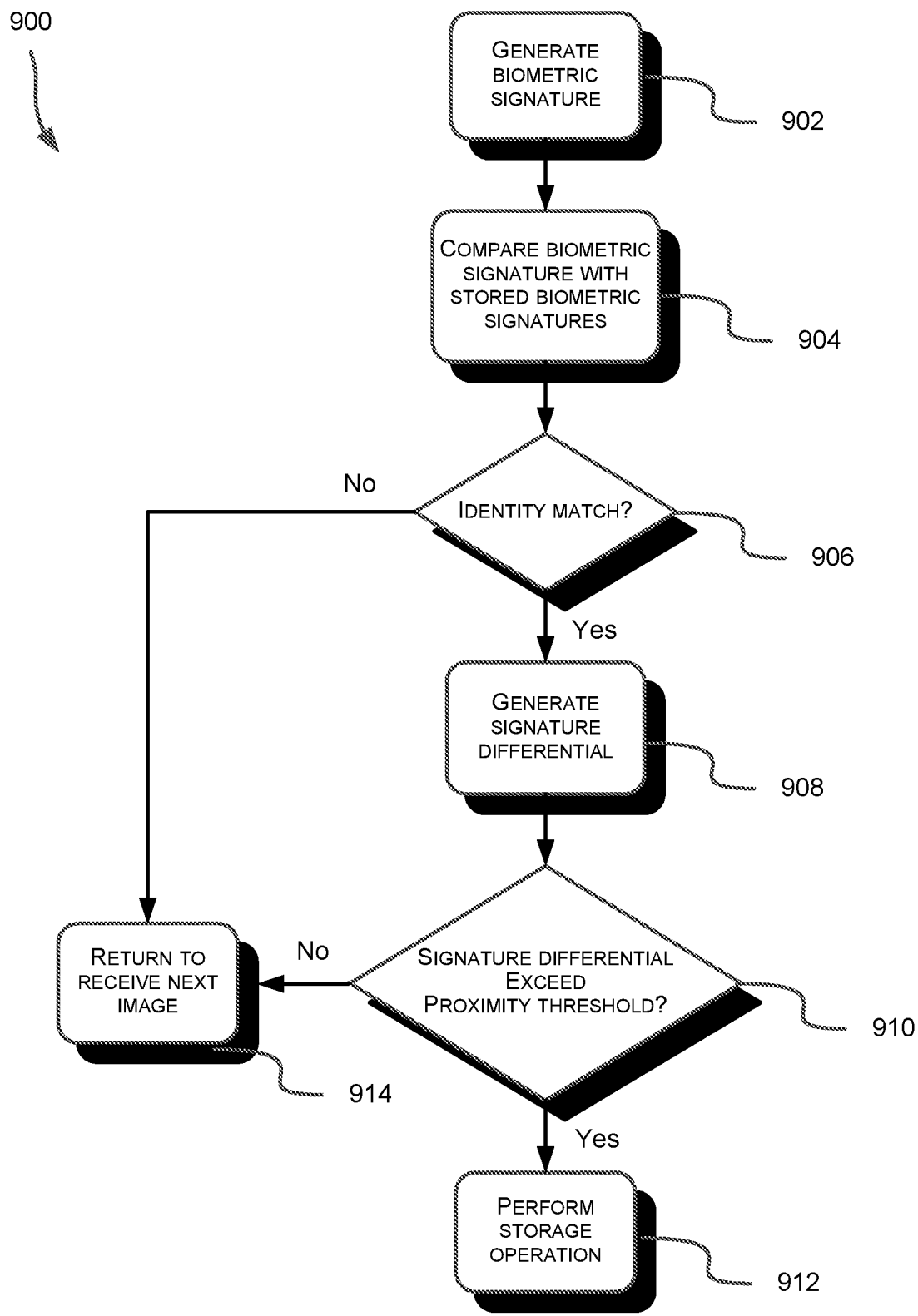
FIG. 9 shows a method in which a biometric signature of a face image is evaluated for storage based on a comparison to a proximity threshold.

FIG. 9 shows a method 900 for determining whether to store a face image as a different face image modality for an identity stored in the data storage 110 according to one or more embodiments. The method 900 may be performed in connection with operations, systems, diagrams, and components described with respect to FIGS. 1 through 8 herein. The method 900, for example, may be performed in connection with performing 810 the facial recognition processing of the method 800 and according to the process 300 of FIG. 3.

The method 900 begins by generating 902 a biometric signature of the face image—for example, the biometric signature 306 of the face image 302 of FIG. 3. Next, the system 100 compares 904 the biometric signature generated in 902 with one or more of the stored biometric signatures 310. The system 100 may obtain the stored biometric signature 312 from the data storage 110 and compare it with the biometric signature 306 to determine whether there is a match therebetween. The method 900 further includes determining 906 whether there is an identity match to an identity stored in the data storage 100 based on a result of the comparison in 904. For instance, a determination that the face image under consideration is a match to a stored identity may be as a result of determining that the biometric signature 306 satisfies a similarity criterion with respect to the stored biometric signature 312. If the system 100 determines in 906 that the face image is a match to a stored identity, the method 900 proceeds to generating 908 a signature differential between the biometric signature 306 and the stored biometric signature 312. If the system 100 determines in 906 that the face image is not a match to a stored identity, the method 900 proceeds to returning 914 to receive another image for evaluation. For example, the method 900 may return to 802 of the method 800.

The method 900 further includes generating 908 the signature differential 316 between the biometric signature 306 and the stored biometric signature 312. The signature differential 316 may correspond to a set of differences between a multidimensional vector of the biometric signature 306 and a multidimensional vector of the stored biometric signature 312, as described with respect to FIG. 3 and elsewhere herein. Thereafter, the method 900 includes determining 910 whether the signature differential 316 generated in 908 exceeds a particular proximity threshold. In particular, the method 900 includes comparing the signature differential 316 with the modality threshold 320. In some embodiments, the modality threshold 320 includes a set of thresholds for corresponding values in the signature differential 316. If the signature differential 316 exceeds the modality threshold 320, the system 100 proceeds to performing 912 the storage operation 322. Performing 912 the storage operation 322 may include storing the biometric signature 306 in association with the corresponding identity in the data storage 110. Performing 912 the storage operation 322 provides an alternate appearance modality for an identity to facilitate identification of the person in the face image using other images showing a different appearance and/or view of the person's face. This improves the robustness of the system 100 to identify persons depicted in images. If the system 100 determines that the signature differential 316 does not exceed the modality threshold 320, the system 100 proceeds to returning 914 to receive the next image for evaluation.

Figure 10:
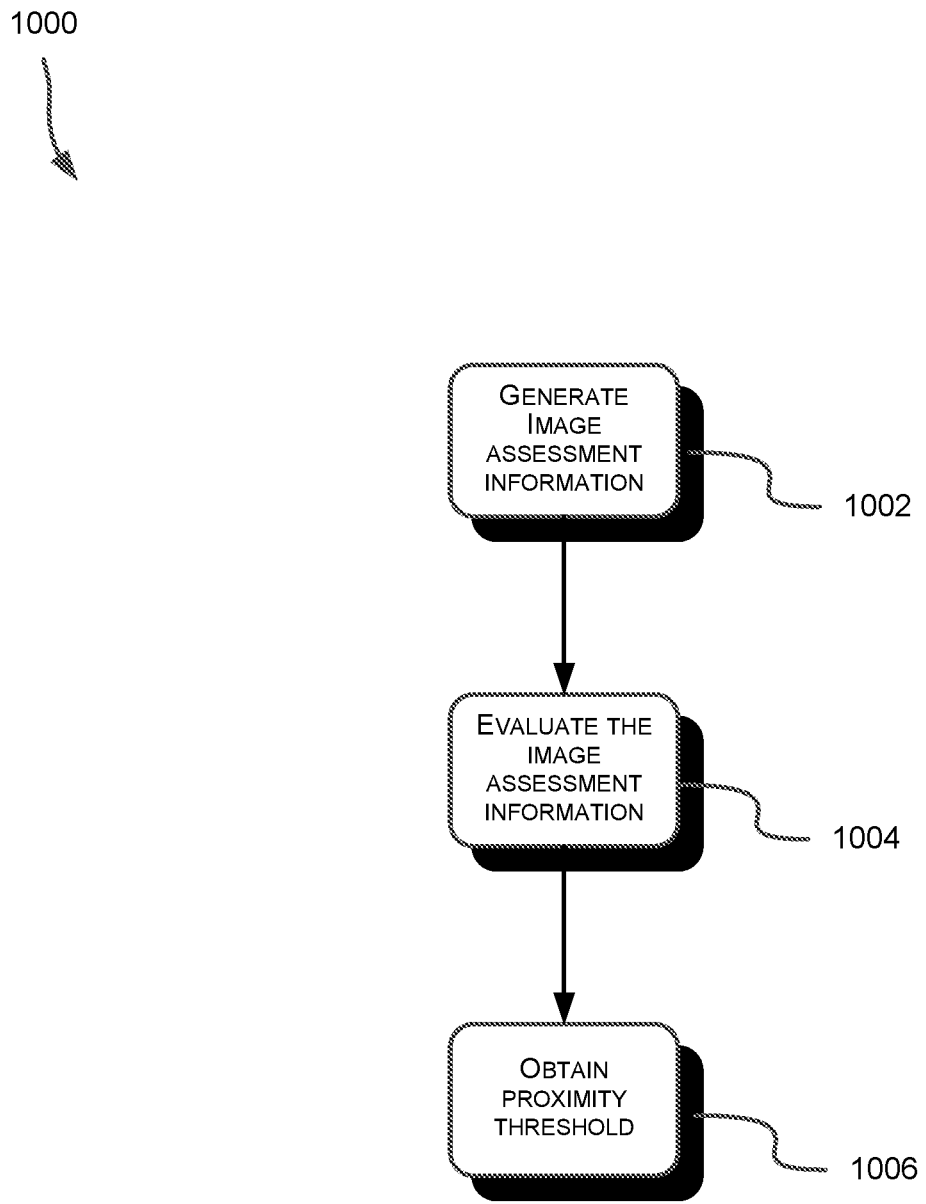
FIG. 10 shows a method in which a proximity threshold is selected based on a result of an image assessment.

FIG. 10 shows a method 1000 for selecting a proximity threshold from among a plurality of proximity thresholds according to one or more embodiments. The method 1000 may be performed in connection with operations, systems, diagrams, and components described with respect to FIGS. 1 through 8 herein. The method 900, for example, may be performed in connection with performing 810 the facial recognition processing of the method 800 and according to the process 400 of FIG. 4.

The method 1000 begins by generating 1002 image assessment information of a face image. The face image may be a face image detected in 804 of the method 800, such as the face image 402 described with respect to FIG. 4 or the face image 212 detected as described with respect to FIG. 2B. The image assessment information generated in 1002 corresponds to the image assessment information 404, which may include at least some of the image assessment information 606 described with respect to FIG. 6. The image assessment information 404 generated in 1002 may include information regarding a modality of the face in the face image 402—for instance, the image assessment information 404 may include information regarding an orientation or pose of the face in the face image 402. As another example, the image assessment information 404 may include information regarding accessories worn on the face in the face image 402 (e.g., sunglasses, jewelry, hat), information regarding facial hair or hairstyle, or information regarding other facets that may affect the appearance of the face in the face image 402. In some embodiments, the image assessment information 404 may include information regarding characteristics of the face image 402 itself, such as a sharpness of the face image 402, a size of the face image 402, and/or a contrast quality of the face image 402, as described herein and in U.S. patent application Ser. No. 16/262,590.

Next, the method 1000 may include evaluating 1004 the image assessment information generated in 1002. For instance, the system 100 may determine an orientation of the face in the face image 402 based on the image assessment information 404. The system 100 may determine that the face is depicted in the face image 402 as being in profile (i.e., side view of the face) or being a front view of the face. As another example, the system 100 may determine that the face depicted in the face image 402 is wearing optical correction glasses with clear lenses, or that the subject is wearing a hat in the face image 402. The result of the evaluation may be obtaining an alphanumeric value from the image assessment information 404 or generating a corresponding alphanumeric value based on the image assessment information 404.

The method 1000 further includes selecting 1006 a proximity threshold from among a plurality of proximity thresholds based on the image assessment information 404 or based on a result of the evaluation performed in 1004. Based on the evaluation in 1004, for example, the system 100 may identify a particular proximity threshold 410 to use from among the plurality of proximity thresholds 412. Selecting 1006 the proximity threshold may include referencing an array or table indicating a proximity threshold or set of proximity thresholds to be used. The proximity threshold 410 may be associated with a defined value or set of defined values that correspond to a modality assessed for the face image 402. The system 100 may obtain the proximity threshold 410 to be used from a location in the memory 112. The system 100 may use the proximity threshold 410 selected in 1006 in the signature comparison 416 described herein.

Figure 11:
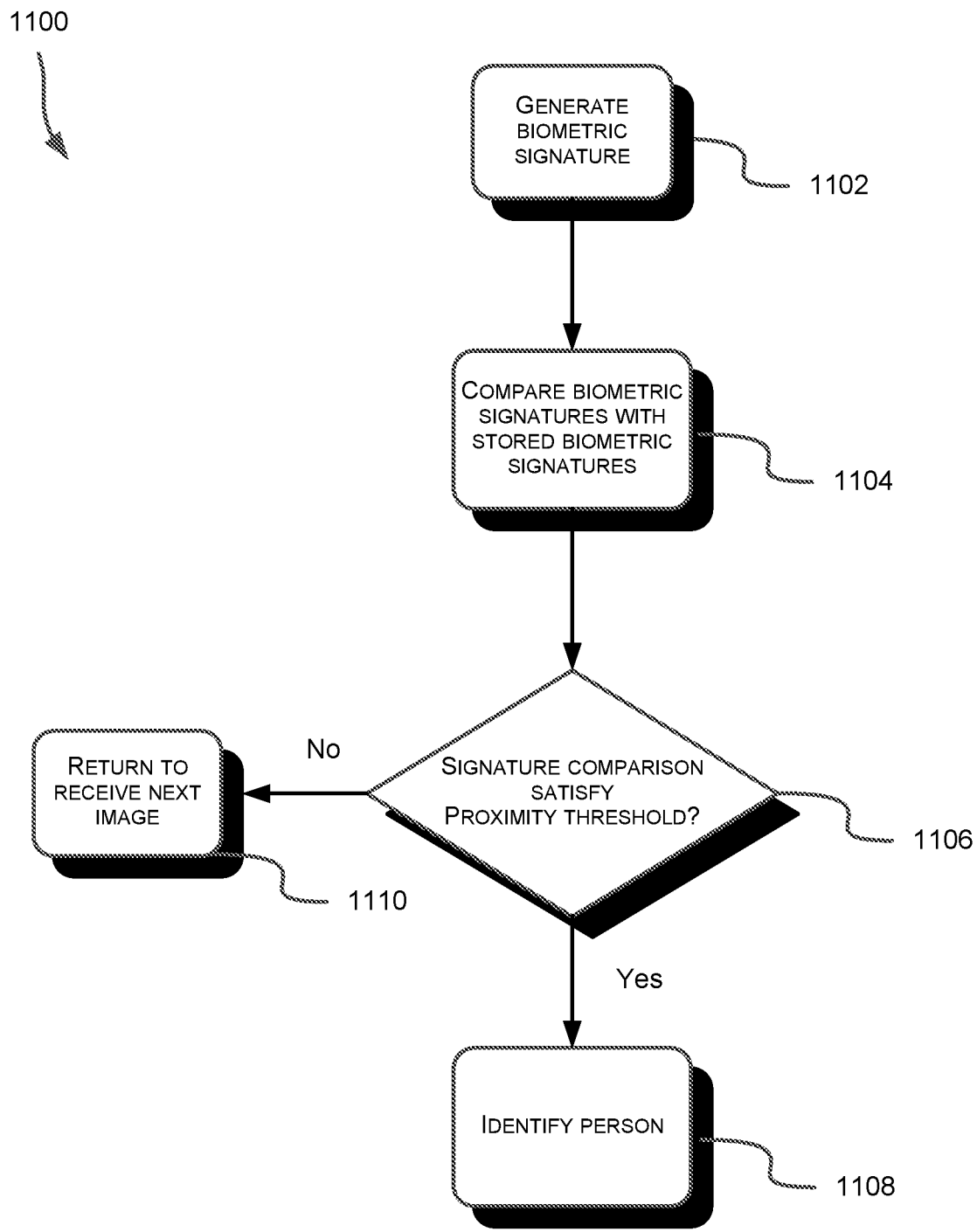
FIG. 11 shows a method in which a person depicted in a face image is identified based on a comparison of biometric signatures to a selected proximity threshold.

FIG. 11 shows a method 1100 of determining an identity of a person shown in a face image according to one or more embodiments. The method 1100 may be performed in connection with operations, systems, diagrams, and components described with respect to FIGS. 1 through 8, and FIG. 10, herein. The method 1100, for example, may be performed in connection with performing 810 the facial recognition processing of the method 800, in connection with performing the method 1000, and in connection with the process 400.

The method 1100 begins by generating 1102 a biometric signature of a face image—for example, generating 1102 the biometric signature 414 of the face image 402 of FIG. 4. Next, the system 100 compares 1104 the biometric signature generated in 1102 with one or more of the stored biometric signatures 310. The system 100 may obtain the stored biometric signature 418 from the data storage 110 and compare it with the biometric signature 414 to determine whether there is a match therebetween. Determining a match between the biometric signature 414 and the stored biometric signature 418 may be used to determine an identity of the person depicted in the face image 402. Comparing 1104 the biometric signature 414 with the stored biometric signature 418 may include determining differences between the biometric signature 414 and the stored biometric signature 418, as described with respect to the process 400 of FIG. 4.

The method 1100 further includes determining 1106 whether the signature comparison in 1104 satisfies the proximity threshold obtained in 1006 of the method 1000. Determining 1106 may include determining whether the differences between the biometric signature 414 and the stored biometric signature 418 satisfy the proximity threshold 410. The system 100 may determine whether the differences are less than corresponding thresholds of a set of proximity thresholds defined in the proximity threshold 410. In some embodiments, the determination in 1106 may include calculating an aggregate, average, or mean between the biometric signature 414 and the stored biometric signature 418 and determining whether the calculated aggregate, average, or mean is less than a proximity value specified in the proximity threshold 410.

If, in 1106, it is determined that the signature comparison satisfies the proximity threshold 410, the method 1100 proceeds to identifying 1108 the person depicted in the face image 402. Identifying 1108 may include providing, e.g., to a user or to another system, identification information identifying the person depicted in the face image 402. In some embodiments, the identification information includes a unique identifier, such as a name, employee number, social security number, or a location/date/time at which the person was previously identified. In some embodiments, the identification information may include information indicating a security clearance level associated with the person identified, or an indication of whether the person is authorized to access a restricted area. If the signature comparison performed in 1106 does not satisfy the proximity threshold 410, the method 1100 proceeds to returning 1110 to receive another image for evaluation. For example, the method 1100 may return to 802 of the method 800.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method, comprising:
    identifying, at a first time, a person in an image based on information associated with an identity stored in data storage;
    obtaining, at a second time after the first time, a first face image of the person;
    retrieving, from data storage, a first biometric signature corresponding to the identity;
    generating a second biometric signature of the first face image;
    calculating a differential between the first biometric signature and the second biometric signature;
    comparing the differential to a defined proximity threshold for appearance modalities;
    obtaining, at a third time after the first time, a second face image of the person;
    generating a third biometric signature of the second face image;
    determining an image differential based on a comparison of the second biometric signature and the third biometric signature; and
    as a result of the differential exceeding the defined proximity threshold and as a result of the image differential being less than an image consistency threshold, storing the second biometric signature in the data storage in association with the identity.

2. The computer-implemented method of claim 1, further comprising:
    determining that the first face image has a first appearance modality based on the biometric signature; and
    determining, as a result of the differential exceeding the defined proximity threshold, that the first biometric signature is of another face image of the person that has a second appearance modality.

3. The computer-implemented method of claim 1, wherein the differential corresponds to a distance in multi-dimensional Euclidean space between the first signature and the second biometric signature, and the defined proximity threshold corresponds to a threshold distance in multidimensional Euclidean space.

4. The computer-implemented method of claim 1, further comprising:
    tracking a face of the person in a sequence of images captured from the first time to the second time, wherein the first face image has a first appearance modality that is different than a second appearance modality of another face image in the sequence of images.

5. The computer-implemented method of claim 1, further comprising:
    comparing the differential to a similarity criterion; and
    as a result of the differential satisfying the similarity criterion, determining that the first face image corresponds to the identity stored in the data storage.

6. The computer-implemented method of claim 1, further comprising:
    generating assessment information for the first face image that includes information regarding one or more characteristics selected from a contrast quality of the first face image, a sharpness of the first face image, a size of the first face image, or an orientation of a face in the first face image;
    comparing the assessment information for the first face image with a set of criteria; and
    determining that the assessment information associated with the first face image satisfies the set of criteria, wherein storing the second biometric signature in the data storage in association with the identity is performed as a result of determining that the assessment information satisfies the set of criteria.

7. The computer-implemented method of claim 6, wherein the assessment information for the first face image includes information regarding the contrast quality of the first face image, the sharpness of the first face image, the size of the first face image, and the orientation of a face in the first face image, and the set of criteria includes a contrast quality criterion, a sharpness criterion, a size criterion, and an orientation criterion.

8. The computer-implemented method of claim 1, wherein the first biometric signature includes a first multi-dimensional vector and the second biometric signature includes a second multidimensional vector, and calculating the differential includes determining a difference between the first multidimensional vector and the second multidimensional vector.

9. The computer-implemented method of claim 1, wherein generating the biometric signature comprises processing the first face image using a machine learning model to generate the second biometric signature.

10. A system, comprising:
    at least one processor; and
    at least one non-transitory storage medium storing a set of instructions that, as a result of execution by the one or more processors, cause the system to:
        identify, at a first time, a person in an image based on information associated with an identity stored in data storage;
        obtain, from a camera at a second time after the first time, a first face image of the person;
        retrieve, from data storage, a first biometric signature corresponding to the identity;
        generate a second biometric signature of the first face image;
        calculate a differential between the first biometric signature and the second biometric signature;
        compare the differential to a defined proximity threshold for appearance modalities;
        obtaining, at a third time after the first time, a second face image of the person;
        generating a third biometric signature of the second face image;
        determining an image differential based on a comparison of the second biometric signature and the third biometric signature; and
        as a result of the differential exceeding the defined proximity threshold and as a result of the image differential being less than an image consistency threshold, store the second biometric signature in the data storage in association with the identity.

11. The system of claim 10, wherein execution of the set of instructions further causes the system to:
    determine that the first face image has a first appearance modality based on the biometric signature; and determine, as a result of the differential exceeding the defined proximity threshold, that the first biometric signature is of another face image of the person that has a second appearance modality.

12. The system of claim 10, wherein the differential corresponds to a distance in multidimensional Euclidean space between the first biometric signature and the second biometric signature, and the defined proximity threshold corresponds to a second distance in multidimensional Euclidean space.

13. The system of claim 10, wherein the execution of the set of instructions further causes the system to:
track a face of the person in a sequence of images captured from the first time to the second time, wherein the first face image has a first appearance modality that is different than a second appearance modality of another face image in the sequence of images.

14. The system of claim 10, wherein the execution of the set of instructions further causes the system to:
compare the differential to a similarity criterion; and
as a result of the differential satisfying the similarity criterion, determine that the first face image corresponds to the identity stored in the data storage.

15. A non-transitory computer-readable medium storing instructions that, as a result of execution by at least one processor, cause the at least one processor to:
identify, at a first time, a person in an image based on information associated with an identity stored in data storage;
obtain, at a second time after the first time, a first face image of the person;
retrieve, from data storage, a first biometric signature corresponding to the identity;
generate a second biometric signature of the first face image;
calculate a differential between the first biometric signature and the second biometric signature;
compare the differential to a defined proximity threshold for appearance modalities;
obtain, at a third time after the first time, a second face image of the person;
generate a third biometric signature of the second face image;
determine an image differential based on a comparison of the second biometric signature and the third biometric signature; and
as a result of the differential exceeding the defined proximity threshold and as a result of the image differential being less than an image consistency threshold, store the second biometric signature in the data storage in association with the identity.

16. The non-transitory computer-readable medium of claim 15, wherein the first biometric signature includes a first multidimensional vector and the second biometric signature includes a second multidimensional vector, and calculating the differential includes determining differences between the first multidimensional vector and the second multidimensional vector.

17. The non-transitory computer-readable medium of claim 15, wherein the instructions include a machine learning model that is trained based on a set of biometric signature training data and a corresponding set of differentials calculated for the biometric signature training data.

* * * * *